Figure 1:
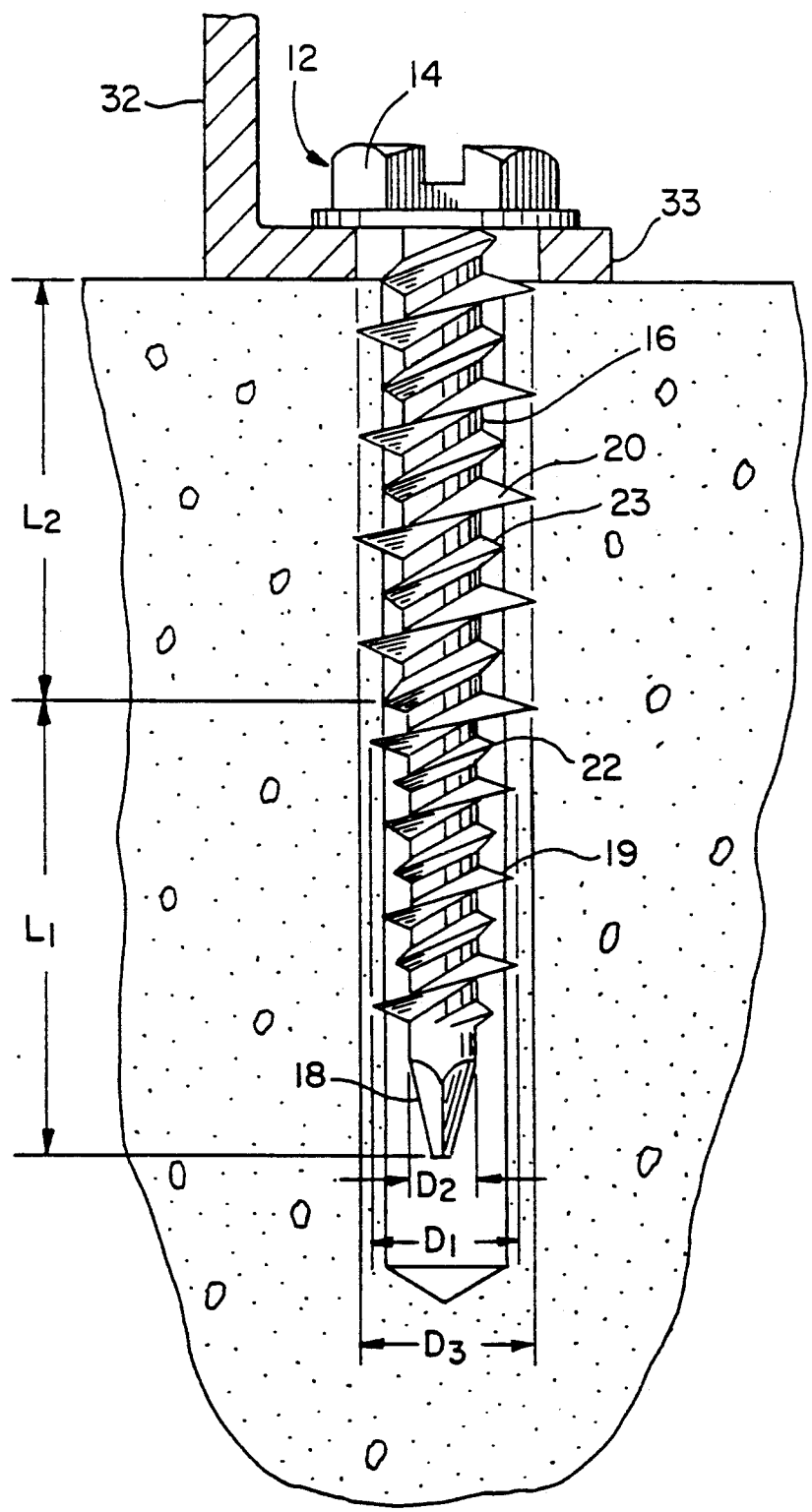

United States Patent [19]

Dixon et al.

[11] Patent Number: 5,061,136
[45] Date of Patent: Oct. 29, 1991

[54] MASONRY SCREW ANCHOR

[75] Inventors: Tony L. Dixon, Knifley, Ky.; David E. Starke, Whitfield, Pa.; Frank Piacenti; Robert W. Brown, Jr., both of Campsville, Ky.

[73] Assignee: Emhart Inc., Del.

[21] Appl. No.: 592,138

[22] Filed: Oct. 3, 1990

[51] Int. Cl.$^5$ .............................................. F16B 35/04
[52] U.S. Cl. ..................................... 411/412; 411/386; 411/426
[58] Field of Search ............... 411/412, 413, 424, 426, 411/386, 387, 411

[56] References Cited

U.S. PATENT DOCUMENTS

| | | | |
|---|---|---|---|
| 1,980,093 | 11/1934 | Rosenberg | 411/412 |
| 3,207,023 | 9/1965 | Knohl | 411/412 |
| 4,655,661 | 4/1987 | Brandt | 411/412 |
| 4,657,460 | 4/1987 | Bien | 411/258 |

FOREIGN PATENT DOCUMENTS 43329 2/1934 France.

Primary Examiner—Neill R. Wilson
Attorney, Agent, or Firm—Spencer T. Smith

[57] ABSTRACT

A masonry screw anchor having two different constant diameter shank portions connected via a taper. Each portion has a set of constant diameter threads and intermediate smaller diameter protrusions with the threads and protrusions on the larger diameter shank portion being larger in diameter than the diameter of the threads and protrusions on the smaller diameter portion.

2 Claims, 2 Drawing Sheets

MASONRY SCREW ANCHOR

The present invention relates generally to an anchor device which is designed to be secured within a bore formed in a masonry structure.

A state of the art anchor device is disclosed in U.S. Pat. No. 4,657,460. That anchor is formed with a sharp helical thread which has a tapering crest diameter which decreases from the trailing extremity of the shank to the entering extremity. Notches formed on the crests of the helical thread provide a means for allowing the helical thread to become firmly embedded in the side walls of the bore hole. A series of helical protrusions are spaced along the shank which provide a means of guiding the screw.

One of the problems with this type anchor design is that the tapered thread acts like a wedge. The deeper it is driven the higher the drive torque to install and this can lead to premature breakage of the screw during installation.

Another negative of this design, which is formed by roll forming dies, is that since the threads are tapered special roll forming dies must be used.

It is accordingly an object of the present invention to provide an effective masonry screw which can be manufactured using commercially available roll form dies to form the threads. This will allow for more control of tolerances pertaining to thread diameter and would also contribute to longer die life.

It is the object of the present invention to provide a masonry anchor which will require a low driving torque but will still provide good resistance to pullout and shear.

Another object of this invention is to provide a screw which has high torsional resistance to minimize breakage that can occur during installation.

Other objects and advantages of the present invention will become apparent from the following portion of the specification and drawings which indicate in accordance with the mandate of the patent which statutes a presently preferred embodiment incorporating the principles of the invention.

REFERRING TO THE DRAWINGS

Figure 2:
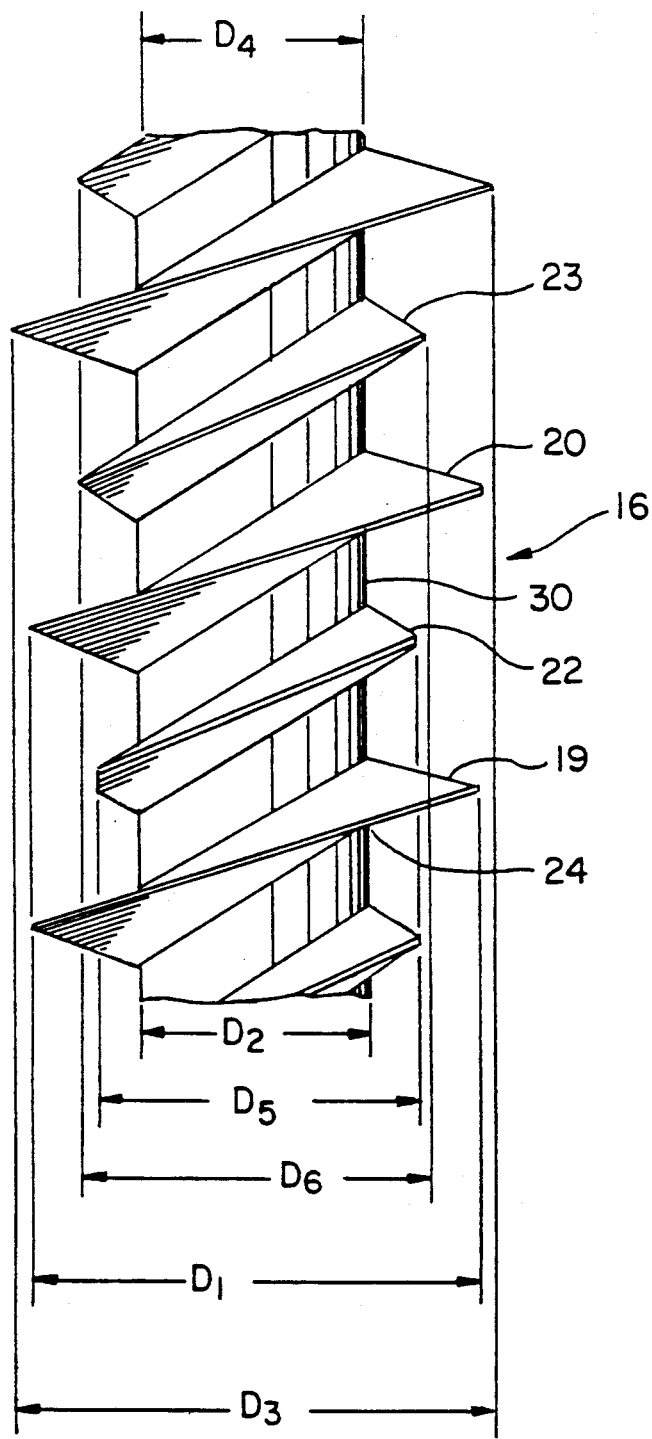

FIG. 1 is a side elevational view of an anchor device made in accordance with the teachings of the present invention embedded in a masonry like structure; and FIG. 2 is an enlarged partial elevation view of a portion of the anchor device shown in FIG. 1.

The masonry screw (10) as illustrated in FIG. 1 is shown with a large head section (12) with appropriate rotation inducing surfaces (14) and an elongated shank (16) with a substantially pointed entering extremity (18). A first set of constant diameter D1, somewhat flat crested helical threads (19) are formed along the constant diameter D2 length L1 of the shank providing a first set of helical protrusions. A second set of constant diameter D3 sharp crested helical threads (20) having a larger diameter than the crest diameter D1 of the first set of threads 19 is formed on the upper length L2 of the shank which has a uniform diameter D2 which is greater than the diameter D2 of the lower shank portion. Spaced between the adjacent protrusions of the first set of threads 19 is a set of helical protrusions (22). The threads (19) and the helical protrusions (22) will have approximately the same pitch and the crest diameter D1, D2 of the thread (19) will be greater than the radial dimension of the helical protrusion (22). Similarly spaced between the adjacent protrusions of the second set of threads 20 is a set of helical protrusions (23) which will have the same pitch as the second set of threads and will have a diameter D6 slightly smaller than the crest diameter D3 of the second set of threads.

The crest diameter of the screw anchor is tapered or stepped 30 as indicated in FIG. 2 to merge the smaller diameter shank portion D2 with the larger diameter portion D4 and the ratio of large crest diameter D3 to large helical protrusions diameter D6 is the same as the ratio of small crest diameter D1 to small helical protrusions diameter D5.

The masonry like structure (28) is provided with a bore (30) through the use of a conventional masonry drilling device. One of the advantages of the present invention is that the fixture to be attached (32) may be positioned on the support structure and provided with an aperture (33) during the drilling operation. When the fixture and structure has been prepared the anchor device (10) is inserted in the bore (30) utilizing fastener drilling apparatus.

As the anchor device (10) is rotated and axially inserted into the bore, the relatively flat crests of the lead thread (19) form threads into the concrete and are embedded into the side walls of the bore. As the device is driven deeper the upper threaded portion (20) having the sharp crested larger diameter threads further engages the threads in the concrete formed by the lower threads (19). The included angle of the threads (19) and (20) are approximately 30 degrees to facilitate the embedment. The radial protrusions (22), (23) which are of a smaller diameter than the bore aid in centering and guiding the device into the bore without adding additional torsional stress during initial installation.

We claim:
1. A masonry screw anchor comprising
   an elongated shank portion including a smaller constant diameter portion having a pointed end and an adjacent larger diameter portion joined therewith via a tapered portion
   a first set of constant diameter threads on said smaller diameter shank portion,
   a first set of constant diameter helical protrusions, having a diameter smaller than the diameter of said first set of threads, on said smaller diameter shank portion between said threads,
   a second set of constant diameter threads on said larger diameter shank portion, said second set of threads having a larger diameter than the diameter of said first set of threads, and
   a second set of constant diameter helical protrusions, having a diameter smaller than the diameter of said second set of threads, on said larger diameter shank portion between said second threads.

2. A masonry screw anchor according to claim 1, wherein the ratio of thread diameter to protrusion diameter for the large shank portion is equal to the same ratio for the smaller shank portion.

* * * * *